United States Patent
Yang et al.

(10) Patent No.: US 11,735,735 B2
(45) Date of Patent: Aug. 22, 2023

(54) METHOD FOR PREDICTING PROCESSABILITY OF ELECTRODE SLURRY AND SELECTING ELECTRODE BINDER

(71) Applicant: LG CHEM, LTD., Seoul (KR)

(72) Inventors: Hwi-Soo Yang, Daejeon (KR); Hyung-Suk Cho, Daejeon (KR); Jong-Heon Seol, Daejeon (KR); Sang-Hoon Choy, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 899 days.

(21) Appl. No.: 16/612,144

(22) PCT Filed: Sep. 27, 2018

(86) PCT No.: PCT/KR2018/011409
§ 371 (c)(1),
(2) Date: Nov. 8, 2019

(87) PCT Pub. No.: WO2019/066480
PCT Pub. Date: Apr. 4, 2019

(65) Prior Publication Data
US 2020/0176776 A1    Jun. 4, 2020

(30) Foreign Application Priority Data
Sep. 28, 2017   (KR) .................. 10-2017-0126526

(51) Int. Cl.
*H01B 1/20*    (2006.01)
*H01M 4/139*   (2010.01)
(Continued)

(52) U.S. Cl.
CPC .............. *H01M 4/622* (2013.01); *H01B 1/24* (2013.01); *H01M 4/139* (2013.01);
(Continued)

(58) Field of Classification Search
CPC .. H01B 1/00; H01B 1/23; H01B 1/24; H01M 4/139; H01M 4/1393; H01M 4/364; H01M 4/633; H01M 2004/021
See application file for complete search history.

(56) References Cited

U.S. PATENT DOCUMENTS 8,852,461 B2 * 10/2014 Liu .................... H01M 10/0525
                                                    252/500
9,214,668 B2 * 12/2015 Liu ....................... H01M 4/621
(Continued)

FOREIGN PATENT DOCUMENTS

CN        1774826 A     5/2006
CN      104880384 A     9/2015
(Continued)

OTHER PUBLICATIONS

Feng et al "Facile approach to SiOx/Si/C composite anode material from bulk SiO for lithium ion batteries", Phys. Chem. Chem. Phys., 2013, 15, 14420.*

(Continued)

*Primary Examiner* — Mark Kopec
(74) *Attorney, Agent, or Firm* — Birch, Stewart, Kolasch & Birch, LLP

(57) ABSTRACT

A method that allows prediction of phase stability of an electrode slurry through a simple method of determining a change in viscosity of the electrode slurry. Therefore, only the electrode slurry having high phase stability is selected before electrode slurry is introduced to a process for manufacturing an electrode. Then, the selected electrode slurry is introduced to the process to provide an improved effect of process efficiency.

8 Claims, 2 Drawing Sheets

(51) Int. Cl.
  *H01M 4/62* (2006.01)
  *H01M 4/1393* (2010.01)
  *H01M 4/36* (2006.01)
  *H01M 10/0525* (2010.01)
  *H01B 1/24* (2006.01)
  *H01M 4/02* (2006.01)

(52) U.S. Cl.
  CPC ......... *H01M 4/1393* (2013.01); *H01M 4/364* (2013.01); *H01M 10/0525* (2013.01); *H01M 2004/027* (2013.01)

(56) References Cited

U.S. PATENT DOCUMENTS

| | | | |
|---|---|---|---|
| 2006/0147799 A1 | 7/2006 | Hayashi et al. | |
| 2009/0267028 A1* | 10/2009 | Hoshiba | H01M 4/139 252/500 |
| 2011/0068294 A1 | 3/2011 | Zaghib et al. | |
| 2011/0171532 A1 | 7/2011 | Okanishi et al. | |
| 2013/0280610 A1* | 10/2013 | Hwang | H01M 4/5825 252/502 |
| 2014/0151609 A1* | 6/2014 | Oguro | H01M 4/622 252/506 |
| 2014/0248537 A1 | 9/2014 | Hayashi et al. | |
| 2015/0044570 A1* | 2/2015 | Kim | H01M 4/364 429/218.1 |
| 2016/0149209 A1 | 5/2016 | Jeon et al. | |
| 2017/0155139 A1* | 6/2017 | Feng | H01M 4/525 |
| 2019/0131628 A1* | 5/2019 | Sugihara | H01M 4/131 |

FOREIGN PATENT DOCUMENTS

| | | |
|---|---|---|
| CN | 105140483 A | 12/2015 |
| CN | 105738827 A | 7/2016 |
| CN | 106124363 A | 11/2016 |
| EP | 3183765 A1 | 6/2017 |
| JP | 2009-39713 A | 2/2009 |
| JP | 2011-238494 A | 11/2011 |
| JP | 2013-84525 A | 5/2013 |
| JP | 2014-179339 A | 9/2014 |
| KR | 10-1998-040000 A | 8/1998 |
| KR | 10-2014-0082975 A | 7/2014 |
| KR | 10-1496309 B1 | 2/2015 |
| KR | 10-2015-0049589 A | 5/2015 |
| KR | 10-2016-0061167 A | 5/2016 |
| KR | 10-2017-0004419 A | 1/2017 |
| WO | WO 2015/098632 A1 | 7/2015 |
| WO | WO 2015/166777 A1 | 11/2015 |
| WO | WO 2016/027080 A1 | 2/2016 |

OTHER PUBLICATIONS

Yang et al "Si/C composites for high capacity lithium storage materials", Electrochemical and Solid-State Letters, 6(8) A154-A156 (2003).*
English language machine translation of JP 2013084525 (pub date May 2013).*
Zuo et al "Synthesis and electrochemical performance of Si/Cu and Si/Cu/graphite composite anode", Materials Chemistry and Physics 104 (2007) 444-447.*
European Communication pursuant to Article 94(3) EPC for corresponding European Application No. 18861548.8, dated May 9, 2022.
Malvern instruments Limited, "A Basic Guide to Particle Characterization," Malvern Instruments Worldwide, 2012, pp. 1-26.
Extended European Search Report dated May 6, 2020 for U.S. Appl. No. 18861548.8.
International Search Report for PCT/KR2018/011409 dated Mar. 14, 2019.
Yang Xiaoping, "Properties of the Resuspension", 'Physical benefication', Metallurgical Industry Press, May 31, 2014, Paragraph 1, p. 131 (ISBN 978-7-5024-6569-8).

* cited by examiner

| Binder | D×(10) (μm) | D×(50) (μm) | D×(90) (μm) |
|---|---|---|---|
| Ref. Ex. | 11.6 | 20.4 | 33.6 |
| Ex. 1 | 13.2 | 23.1 | 39.6 |
| Ex. 2 | 18 | 33.1 | 59.6 |
| Comp. Ex. 1 | 30 | 63.5 | 117 |

METHOD FOR PREDICTING PROCESSABILITY OF ELECTRODE SLURRY AND SELECTING ELECTRODE BINDER

TECHNICAL FIELD

The present application claims priority to Korean Patent Application No. 10-2017-0126526 filed on Sep. 28, 2017 in the Republic of Korea, the disclosures of which are incorporated herein by reference. The present disclosure relates to a method for predicting process compatibility, such as a change in viscosity, of electrode slurry in the manufacture of an electrode for an electrochemical device and selecting a suitable type and content of binder.

BACKGROUND ART

As technological development and a need for mobile instruments have increased, secondary batteries have been increasingly in demand as energy sources. Among such secondary batteries, lithium secondary batteries having high energy density and operating voltage, long cycle life and a low self-discharge rate have been commercialized and used widely.

Such lithium secondary batteries have been developed in a model capable of realizing high voltage and high capacity corresponding to the consumers' needs. To realize high capacity, it is required to optimize the four main elements of a lithium secondary battery, i.e., a positive electrode material, negative electrode material, separator and an electrolyte, in a limited space.

Particularly, the negative electrode includes a negative electrode mixture layer formed on at least one surface of a current collector, and the negative electrode mixture layer is prepared by applying and drying negative electrode slurry containing a negative electrode active material, binder polymer, conductive material and a dispersion medium.

The binder polymer functions to fix the electrode active material stably in the electrode and to prevent detachment of particles. However, the binder polymer tends to increase the viscosity of electrode slurry or tends to be gelled with the lapse of time. When the slurry is gelled or its viscosity is increased excessively, filter blocking and an increase in viscosity occur during the manufacture and transport of negative electrode slurry. This may result in disposal or coating defects of the negative electrode slurry. Therefore, there is a need for a method for preparing negative electrode slurry for a secondary battery which undergoes a small change with the lapse of time.

DISCLOSURE

Technical Problem

The present disclosure is directed to providing a method for predicting process compatibility, such as a change in viscosity and phase stability, of electrode slurry and selecting a suitable electrode slurry composition and binder ingredient and content, in the manufacture of an electrode for an electrochemical device. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure is designed to solve the problems of the related art. In one aspect of the present disclosure, there is provided a method for selecting an electrode slurry which can determine the phase stability of the electrode slurry. According to the first embodiment of the present disclosure, there is provided a method for selecting electrode slurry which includes determining a particle size distribution of composite particles in a mixed sample comprising a plurality of electrode active material particles, a polymer resin for a binder and a solvent, and comparing the particle size distribution of the composite particles with a particle size distribution of the electrode active material particles and based upon the result, determining a phase stability of the electrode slurry.

According to the second embodiment of the present disclosure, there is provided the method for selecting the electrode slurry as defined in the first embodiment, wherein the mixed sample includes an electrode active material, a polymer resin for a binder and a solvent, and the electrode active material particles comprise a carbonaceous material and the solvent is water.

According to the third embodiment of the present disclosure, there is provided the method for selecting the electrode slurry as defined in the first or the second embodiment, wherein the mixed sample includes an electrode active material, a polymer resin for a binder and a solvent, and the polymer resin for the binder is present in an amount of 0.05-0.3 parts by weight based on 1 part by weight of the electrode active material and the solvent is used in an amount of 8-15 parts by weight based on 1 part by weight of the electrode active material particles.

According to the fourth embodiment of the present disclosure, there is provided the method for selecting the electrode slurry as defined in any one of the first to the third embodiments, wherein the polymer resin for the binder is a particle-shaped polymer.

According to the fifth embodiment of the present disclosure, there is provided the method for selecting the electrode slurry as defined in any one of the first to the fourth embodiments, wherein the composite particles are formed by aggregation of solid contents contained in the electrode slurry.

According to the sixth embodiment of the present disclosure, there is provided the method for selecting the electrode slurry as defined in any one of the first to the fifth embodiments, wherein $D_{50}$ of the composite particles in the mixed sample is compared with $D_{50}$ of negative electrode active material particles.

According to the seventh embodiment of the present disclosure, there is provided the method for selecting the electrode slurry as defined in any one of the first to the sixth embodiments, which further includes comparing $D_{10}$ and/or $D_{90}$ of the composite particles in the mixed sample with $D_{10}$ and/or $D_{90}$ of negative electrode active material particles.

According to the eighth embodiment of the present disclosure, there is provided the method for selecting the electrode slurry as defined in any one of the first to the seventh embodiments, wherein the polymer resin for the binder is selected as the polymer resin for the binder for preparing the electrode slurry, when the condition of Formula 1 is satisfied:

$D_{50}$ of composite particles<$D_{50}$ of negative electrode active material particles×$A$,  [Formula 1]

wherein A is 0.001-10.0.

According to the ninth embodiment of the present disclosure, there is provided the method for selecting the electrode slurry as defined in any one of the first to the eighth embodiments, wherein the polymer resin for the binder introduced to the mixed sample is selected as the polymer resin for the binder for preparing the electrode slurry, when the condition of Formula 2 and/or the condition of Formula 3 is satisfied in addition to the condition of Formula 1:

$D_{10}$ of composite particles<$D_{10}$ of negative electrode active material particles×$A$  [Formula 2]

$D_{90}$ of composite particles<$D_{90}$ of negative electrode active material particles×$A$  [Formula 3]

In Formula 2 and Formula 3, each A independently represents 0.001-10.0.

According to the tenth embodiment of the present disclosure, there is provided the method for selecting the electrode slurry as defined in any one of the first to the ninth embodiments, wherein the polymer resin for the binder introduced to the mixed sample is selected as the polymer resin for the binder for preparing electrode slurry, when the condition of Formula 2 and the condition of Formula 3 are satisfied in addition to the condition of Formula 1:

$D_{10}$ of composite particles<$D_{10}$ of negative electrode active material particles×$A$  [Formula 2]

$D_{90}$ of composite particles<$D_{90}$ of negative electrode active material particles×$A$  [Formula 3]

In Formula 2 and Formula 3, each A independently represents 1-3.

According to the eleventh embodiment of the present disclosure, there is provided the method for selecting the electrode slurry as defined in any one of the first to the tenth embodiments, wherein A ranges from 0.001-10.0 in Formula 1 to Formula 3, and A is determined considering at least one selected from the group consisting of introduced materials, slurry concentration, processing time, transport distance of slurry, temperature of slurry, temperature condition of slurry storage place, humidity condition of slurry storage plate and slurry storage time.

Advantageous Effects

According to the present disclosure, it is possible to predict phase stability of electrode slurry through a simple method of determining a change in viscosity of the electrode slurry. Therefore, only the electrode slurry having high phase stability is selected before electrode slurry is introduced to a process for manufacturing an electrode. Then, the selected electrode slurry is introduced to the process to provide an improved effect of process efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or ratios of the elements in the accompanying drawing may be exaggerated for the purpose of more clear description.

BEST MODE

Figures 1, 2:
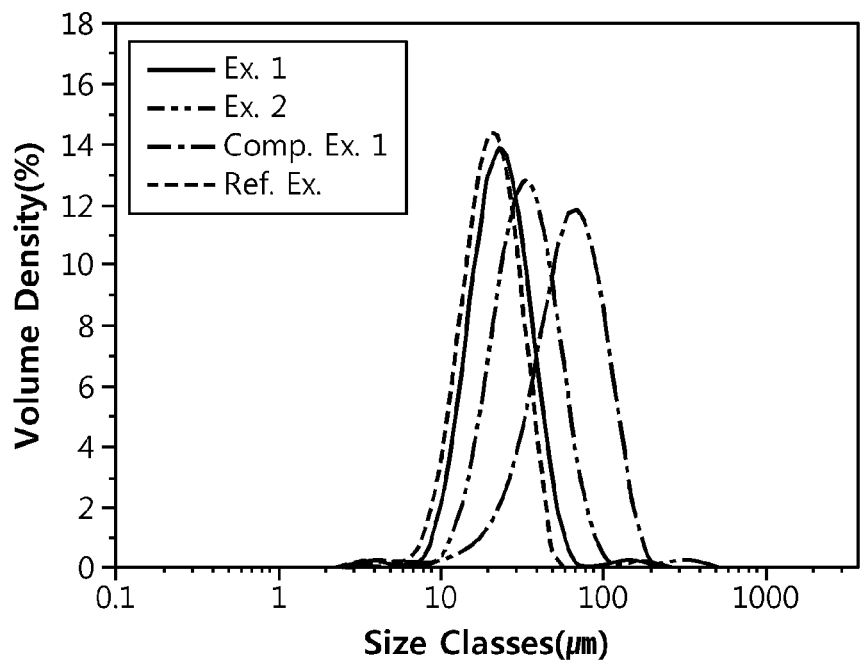
FIG. 1 and FIG. 2 illustrate the particle size distribution of composite particles in the slurry according to each of Example and Comparative Example in comparison with the particle size distribution of the used electrode active material.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected to another portion by way of the other element interposed between them.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

Hereinafter, preferred embodiments of the present disclosure will be explained in detail. However, the scope of the present disclosure is not limited to the following embodiments.

In one aspect of the present disclosure, there is provided a method for selecting electrode slurry which includes determining a composition and preparation condition of electrode slurry causing no change in viscosity or gelling, and providing electrode slurry prepared with the composition under the preparation condition. The method according to the present disclosure relates to a method for selecting electrode slurry which includes predicting phase stability of electrode slurry through a simple process, and preliminarily determining ingredients, composition and preparation condition of electrode slurry suitable for introducing to an actual process for manufacturing an electrode.

In another aspect of the present disclosure, there is provided a method for selecting ingredients and/or contents of a binder for an electrode suitable for preparing electrode slurry. The method for selecting a binder for an electrode according to the present disclosure may be carried out by preparing a mixed sample for a test containing an electrode active material and a binder, determining the particle size distribution of the composite particles contained in the sample, and comparing the particle size distribution with the particle size distribution of the electrode active material particles. According to the present disclosure, the mixed sample may include an electrode active material and a binder. According to the present disclosure, it is possible to prepare electrode slurry having excellent process efficiency, based on the data of the type and content of a binder obtained from the above-mentioned method.

Hereinafter, the present disclosure will be explained in detail.

First, a mixed sample for a test is prepared (S10). According to an embodiment of the present disclosure, the mixed sample includes ingredients used for manufacturing an electrode for an electrochemical device. According to another embodiment of the present disclosure, the mixed sample includes an electrode active material, a polymer resin for a binder and a solvent. The mixed sample may further include a conductive material. According to the present disclosure, the mixed sample include, as an electrode active material, a negative electrode active material or a positive electrode active material. Particularly, the negative electrode active material may be a carbonaceous material, wherein the mixed sample may be prepared in an aqueous base including water. In addition, the polymer resin for a binder may be a particle-shaped polymer. According to still another embodiment of the present disclosure, the mixed sample may include an electrode active material, conductive material, or the like, in an aqueous emulsion containing a particle-shaped polymer. However, the scope of the present disclosure is not limited to any specific ingredients contained in slurry. The ingredients are not particularly limited, as long as they are used for manufacturing an electrode for an electrochemical device. According to the present disclosure, the aqueous emulsion covers any dispersion of particle-shaped polymer in an aqueous solvent, such as water.

According to an embodiment of the present disclosure, the ingredients, such as an electrode active material, binder, conductive material, solvent, or the like may be selected from candidate groups for the ingredients to be used for preparing electrode slurry. In other words, the mixed sample is prepared in order to test the processability of the ingredients to be used for preparing electrode slurry, before preparing the slurry.

As used herein, the electrochemical device includes any types of devices carrying out electrochemical reactions. Particular examples of the electrochemical device include any types of primary batteries, secondary batteries, fuel cell, solar cells or capacitors. Particularly, among the secondary batteries, lithium secondary batteries, including lithium metal secondary batteries, lithium ion secondary batteries, lithium polymer secondary batteries or lithium ion polymer secondary batteries, are preferred.

According to an embodiment of the present disclosure, the mixed sample may be prepared by agitation to carry out mixing of the ingredients contained in the sample. Herein, agitation rate, time, or the like are not particularly limited. However, various processing conditions, such as agitation rate or time, used for preparing each mixed sample may be recorded. When a mixed sample is selected as electrode slurry, the processing conditions applied to the preparation of the corresponding mixed sample may be applied to the preparation of electrode slurry so that they may be reproduced. According to the present disclosure, agitation of the mixed sample may be carried out by agitation using a magnetic stick or mechanical agitation.

According to an embodiment of the present disclosure, the mixed sample may be prepared by introducing an electrode active material and a binder into a solvent. Herein, the binder may be used in an amount of 0.05-0.3 parts by weight based on 1 part by weight of the electrode active material, and the solvent may be used in an amount of 8-15 parts by weight based on 1 part by weight of the electrode active material.

Next, the particle size distribution of the composite particles in the mixed sample prepared in (S10) is determined (S20). According to the present disclosure, the composite particles are formed by aggregation of solid contents in the ingredients introduced into the mixed sample. For example, when the mixed sample includes an electrode active material and a polymer resin for a binder as solid contents, the composite particles includes at least one of the electrode active material and the polymer resin for a binder. When the mixed sample further includes a conductive material, the composite particles may include at least one of the electrode active material, the polymer resin for a binder and the conductive material. Then, the particle size distribution of the mixed sample is compared with the particle size distribution of the electrode active material particles (S30). The inventors of the present disclosure have found that there is a certain correlation between the particle size distribution of the composite particles and that of the electrode active material particles and such a correlation becomes a factor affecting a change in viscosity and/or gelling of slurry. The present disclosure is based on this finding.

According to an embodiment of the present disclosure, determination of the particle size distribution is carried out by comparing the particle diameter of the composite particles contained in the mixed sample with that of the negative electrode active material particles, and then checking whether or not the particle diameters satisfy at least one of the following conditions of Formula 1 to Formula 3:

$$D_{50} \text{ of composite particles} < D_{50} \text{ of negative electrode active material particles} \times A \quad \text{[Formula 1]}$$

(A=0.001-10.0).

$$D_{10} \text{ of composite particles} < D_{10} \text{ of negative electrode active material particles} \times A \quad \text{[Formula 2]}$$

(A=0.001-10.0).

$$D_{90} \text{ of composite particles} < D_{90} \text{ of negative electrode active material particles} \times A \quad \text{[Formula 3]}$$

(A=0.001-10.0).

According to an embodiment of the present disclosure, the particle diameter of the composite particles is compared with that of the negative electrode active material particles, and then it is checked whether the particle diameters satisfy the condition of the above Formula 1 or not.

In a variant, it is checked whether or not the particle diameters satisfy the above Formula 1 and Formula 2, or the above Formula 1 and Formula 3. The determination may be carried out by checking whether or not the particle diameters satisfy the above Formulae in terms of $D_{50}$ and $D_{10}$, or $D_{50}$ and $D_{90}$.

In another variant, it is checked whether or not the particle diameters satisfy all of the above Formula 1 to Formula 3 in terms of $D_{50}$, $D_{10}$ and $D_{90}$.

As described hereinafter, the composite particles according to the present disclosure result from the aggregation of the binder and active material. It is thought that processability is decreased, as the particle diameter of the composite particles is increased. Thus, according to an embodiment of the present disclosure, the processability may be evaluated based on the average particle diameter $D_{50}$ of the particles. In addition, when more strict criteria are required depending on processing conditions, a combination satisfying the above Formulae in terms of $D_{10}$ and/or $D_{90}$ together with $D_{50}$ may be selected.

According to an embodiment of the present disclosure, the particle size distribution may be determined by using a particle size distribution measuring system, such as Particle Size Distribution (PSD) using a laser diffraction method. In addition, based on the results of measurement, particle sizes may be expressed as integrated values from a smaller particle diameter side. According to another embodiment of the present disclosure, the particle diameter ($D_{10}$) can be defined as the particle diameter corresponding to 10% on the volume average particle diameter basis, i.e., as the particle diameter corresponding to 10% of the total volume when particle diameters are measured and the volumes are integrated from smaller particles. In addition, the particle diameter ($D_{50}$) can be defined as the particle diameter corresponding to 50% on the volume average particle diameter basis, i.e., as the particle diameter corresponding to 50% of the total volume when particle diameters are measured and the volumes are integrated from smaller particles. Further, the particle diameter ($D_{90}$) can be defined as the particle diameter corresponding to 90% on the volume average particle diameter basis, i.e., as the particle diameter corresponding to 90% of the total volume when particle diameters are measured and the volumes are integrated from smaller particles.

If a mixed sample satisfies at least one condition of the above Formula 1 to Formula 3, the ingredients introduced into the mixed sample are selected as ingredients applicable to preparation of electrode slurry (S40). Herein, the expression 'selected as ingredients for electrode slurry' means that the combination of ingredients, particularly the combination of the ingredients introduced into the mixed sample, and more particularly the combination of the active material with binder ingredients introduced to the mixed sample is suitable in terms of processability. Otherwise, it means that the combination of the active material, binder and the solvent introduced into the mixed sample is suitable in terms of processability. In other words, according to the method of the present disclosure, it is possible to determine the behaviors of slurry ingredients and effects thereof when they are mixed in a dispersion medium, such as a solvent, through a simple process. When mixed sample satisfies at least one condition of the above Formula 1 to Formula 3, it can be expected that use of the active material in combination with the binder ingredients contained in the mixed sample for preparation of slurry, or use of the electrode active material, binder and solvent ingredients for preparation of slurry provides excellent processing efficiency.

Then, the ingredients selected from the above-mentioned steps are used to prepare electrode slurry (S50). According to an embodiment of the present disclosure, the electrode slurry may include an electrode active material, binder and a solvent. Herein, at least the electrode active material and binder may be the same ingredients as used for the mixed sample.

According to the present disclosure, the above Formula 1 to Formula 3 may represent values modified suitably depending on various conditions, such as conditions of a process for manufacturing an electrode, types of ingredients contained in a mixed sample, solid content of slurry, or the like. According to an embodiment of the present disclosure, A may be selected suitably within a range of 0.001-10.00 depending on the conditions of preparation of electrode slurry. According to another embodiment of the present disclosure, A may be 0.1 or more, 1.0 or more, or 1.5 or more, and 7.0 or less, 5.0 or less, or 3.0 or less, within the above-defined range. For example, A may be 0.1-5.0. According to still another embodiment of the present disclosure, A may be 0.1-3.0, or 0.1-2.0. As used herein, composite particles result from aggregation of a binder with an active material. It is thought that processability is decreased, as the particle diameter of composite particles is increased. The above Formulae are designed to screen a combination of a binder with an active material providing an excessively large particle diameter of composite particles through mixed samples. When the particle diameter of composite particles is within predetermined multiple number ranges based on the particle diameter of an active material, the corresponding combination is selected as materials for an electrode. If A is set to an excessively large number more than 10, it is not possible to perform screening suitably. Meanwhile, A may be predetermined suitably considering processing conditions, such as introduced materials, slurry concentration, processing time, slurry transport distance, slurry temperature, temperature and/or humidity conditions of slurry storage places, slurry storage time, or the like, within the above-defined range. For example, when the slurry transport distance is short, A may be increased within the above-defined range. On the contrary, when the slurry transport distance is increased, A may be decreased to strict the range of particle diameters of composite particles strictly.

According to the present disclosure, when a mixed sample satisfies at least one of the above Formula 1 to Formula 3, it undergoes a small change in viscosity with time and its gelling is delayed significantly. Thus, the method according to the present disclosure may provide relatively accurate data for predicting phase stability of slurry.

In addition, the method according to the present disclosure may be applied to a case wherein there is a difficulty in determining the accurate types of introduced ingredients. The method according to the present disclosure is not based on the individual characteristics of each of the ingredients for an electrode but is based on the data obtained through the particle size distribution of composite particles determined in a mixed sample for a test after the mixed sample is prepared. Therefore, although particular characteristics of each ingredient may affect a change in viscosity of the subsequently prepared electrode slurry, the method of determining the particle size distribution of composite particles and comparing the particle size distribution with that of electrode active material particles according to the present disclosure does not require determination of particular characteristics of each ingredient. For example, when a binder is selected, it is not required to determine the particular molecular weight of each binder or the like. The present disclosure is directed to determining whether electrode slurry prepared by introducing selected ingredients at a predetermined ratio has high processability or not. By virtue of such characteristics, the method according to the present disclosure allows a blind test for ingredients, particularly binders, introduced to an electrode.

According to an embodiment of the present disclosure, the conductive material may be any conventional conductive material used for manufacturing an electrode. Non-limiting examples of the conductive material include any one selected from carbon nanotubes, acetylene black, carbon black, natural graphite, artificial graphite, ketjen black and carbon black, or a combination of two or more of them. According to the present disclosure, the conductive material has a particle diameter of 1-100 μm, preferably 3-30 μm. When the particle diameter of the conductive material is smaller than the above-defined range, it is difficult to control generation of aggregates of conductive material particles. Meanwhile, when the particle diameter of the conductive material is larger than the above-defined range, phase stability of slurry may be degraded undesirably.

Particularly, the conductive material may be carbon nanotubes (CNT). Carbon nanotubes are excellent in terms of strength, heat conductivity, heat stability and copper conductivity. However, such characteristics can be accomplished when carbon nanotubes are distributed homogeneously and carbon nanotubes are in contact with an active material to the highest degree. Therefore, there is a need for carbon nanotubes to be isolated as much as possible, i.e., to be distributed without aggregation.

The dispersion medium used for preparing negative electrode slurry for a secondary battery according to an embodiment of the present disclosure is not particularly limited, as long as it dissolves a thickener suitably. For example, the dispersion medium that may be used includes an aqueous dispersion medium, such as water or an organic solvent as which can be mixed homogeneously with water (lower alcohol or lower ketone), a non-aqueous dispersion medium, such as N-methyl pyrrolidone (NMP), or the like.

According to an embodiment of the present disclosure, particular examples of the negative electrode active material include, but are not limited to: carbonaceous materials, such as natural graphite, artificial graphite, expanded graphite, carbon fibers, non-graphitizable carbon, carbon black, carbon nanotubes, fullerene and activated carbon; metals capable of alloying with lithium, such as Al, Si, Sn, Ag, Bi, Mg, Zn, In, Ge, Pb, Pd, Pt and Ti, and compounds containing such elements; metals, compounds thereof and composites of carbon with graphitic materials; lithium-containing nitrides. Among them, carbonaceous materials are more preferred.

In addition, the carbonaceous materials preferably include spherical particles and may be natural graphite having a crystallinity corresponding to R value ($[R=I_{1350}/I_{1580}]$, wherein $I_{1350}$ is the Raman intensity around 1350 cm$^{-1}$, and $I_{1580}$ is the Raman intensity around 1580 cm$^{-1}$) of 0.30-1.0.

Such natural graphite may be prepared in spherical shapes by pulverization and particle formation of a crude scale-like natural graphite material. The prepared spherical natural graphite has a minimized specific surface area to reduce decomposition of an electrolyte on the active material surface. Therefore, when the spherically particle-shaped natural graphite is used in combination with scale-like natural graphite, it is possible to increase the packing density and energy density of an electrode.

According to an embodiment of the present disclosure, the binder polymer may be at least one selected from the group consisting of styrene-butadiene rubber (SBR), polyvinylidene fluoride (PVdF), polyhexafluoropropylene-co-polyvinylidene fluoride (PVdF-co-HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene (PTFE), polyvinyl chloride, polyacrylonitrile, polyvinyl pyridine, acrylonitrile-butadiene rubber and ethylene propylene diene monomer (EPDM). More preferably, the binder polymer may be styrene-butadiene rubber (SBR).

The styrene-butadiene rubber has strong adhesion to provide an effect as a binder even in a small amount, and is suitable for manufacturing an aqueous electrode by combining carboxymethyl cellulose having high water solubility and good properties as a thickener with styrene-butadiene rubber as a binder.

It is apparent to those skilled in the art that the content of each of the ingredients of slurry may be varied suitably depending on the characteristics of a negative electrode to be finished or a battery including the negative electrode without departing from the scope of the present disclosure. In addition, the negative electrode slurry according to the present disclosure may further include additives, such as a stabilizing agent, flame retardant, lubricant, antioxidant, plasticizer, dispersant and an antistatic agent, within the acceptable range.

In another aspect of the present disclosure, there is provided a negative electrode using the negative electrode slurry according to the present disclosure and an electrochemical device including the same. According to the present disclosure, the electrochemical device includes any device carrying out electrochemical reactions and particular examples thereof include any types of primary batteries, secondary batteries, fuel cells, solar cells, or capacitors, such as super capacitor devices. Particularly, among the secondary batteries, lithium secondary batteries, including lithium metal secondary batteries, lithium ion secondary batteries, lithium polymer secondary batteries or lithium ion polymer secondary batteries, are preferred.

According to an embodiment of the present disclosure, the lithium secondary battery includes a positive electrode, a negative electrode and a separator interposed between the negative electrode and the positive electrode.

The negative electrode may be obtained by applying and drying the above-described negative electrode slurry on a negative electrode current collector. The negative electrode current may be any metal having high conductivity, as long as it allows easy adhesion of a negative electrode mixture and shows no reactivity within the voltage range of an electrochemical device. Although there is no particular limitation in the current collector, particular examples of the current collector that may be used include stainless steel, aluminum, nickel, titanium, baked carbon, or aluminum or stainless steel surface-treated with carbon, nickel, titanium, silver, or the like. In addition, the current collector may have fine surface irregularities formed on the surface thereof to increase the adhesion of a negative electrode active material, and may have various shapes, such as a film, sheet, foil, net, porous body, foam or non-woven web body. Particularly, the current collector may be foil prepared by using aluminum, nickel or a combination thereof, or a stack of substrates made of the above-mentioned materials.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide (LiCoO$_2$) and lithium nickel oxide (LiNiO$_2$), or those compounds substituted with one or more transition metals; lithium manganese oxides such as those represented by the chemical formula of Li$_{1+x}$Mn$_{2-x}$O$_4$ (wherein x is 0-0.33), LiMnO$_3$, LiMn$_2$O$_3$ and LiMnO$_2$; lithium copper oxide (Li$_2$CuO$_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

In general, the positive electrode current collector is formed to have a thickness of 3-500 μm. The positive electrode current collector is not particularly limited, as long as it causes no chemical change in the corresponding battery and has high conductivity. Particular examples of the positive electrode current collector may include stainless steel; aluminum; nickel; titanium; baked carbon; copper; stainless steel surface-treated with carbon, nickel, titanium or silver; or the like. It is possible to increase the adhesion of a positive electrode active material by forming fine surface irregularities on the surface of a current collector. The positive electrode current collector may have various shapes, such as a film, sheet, foil, net, porous body, foam and a non-woven web body.

The binder for a positive electrode active material is an ingredient which assists the binding between an active material with a conductive material and the binding to a current collector. In general, the binder is added in an amount of 1-50 wt % based on the total weight of the positive electrode mixture. The binder may be high-molecular weight polyacrylonitrile-co-acrylate, but is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butyrene rubber, fluororubber, various copolymers, or the like.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include: olefinic polymers, such as polypropylene having chemical resistance and hydrophobicity; sheets or non-woven webs made of glass fibers or polyethylene; or the like.

The secondary battery according to the present disclosure may be obtained by introducing and sealing an electrode assembly formed by stacking the positive electrode and negative electrode alternately with the separator interposed therebetween into a casing material, such as a battery casing, together with an electrolyte. Any conventional methods for manufacturing secondary batteries may be used with no particular limitation.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(1) Preparation of Electrode Slurry

The ingredients of the following Table 1 were used to prepare mixed samples. Herein, the active material, binder and the solvent were mixed at a weight ratio of 9.5:0.5:90. Reference Example was for determination of the particle size distribution of active material particles and merely includes the active material and solvent mixed at a weight ratio of 10:90.

TABLE 1

|  | Reference Ex. | Ex. 1 | Ex. 2 | Comp. Ex. 1 |
| --- | --- | --- | --- | --- |
| Negative electrode active material | Artificial graphite | Artificial graphite | Artificial graphite | Artificial graphite |
| Binder | — | Styrene Butadiene Rubber(A) | Styrene Butadiene Rubber(B) | Styrene Butadiene Rubber(C) |
| Solvent | D.I water | D.I water | D.I water | D.I. water |

(2) Determination of Particle Size Distribution

Each mixed sample prepared as described above was placed on a rubber roller and mixed for 10 minutes under 50 rpm. The particle diameter of each sample was measured by using a Particle Size Distribution (PSD) measuring system (Anton Paar) to determine the particle size distribution and was checked whether it satisfied the following Formula 1 to Formula 3 or not. Herein, A in each Formula was set to 2. The results are shown in FIG. 1 and FIG. 2. It can be seen that $D_{50}$ of the composite particles is smaller than $D_{50} \times 2$ of the active material particles in the case of Examples 1 and 2. In the case of Comparative Example 1, $D_{50}$ of the composite particles is 63.5 μm, which is larger than $D_{50} \times 2$ of the active material particles.

$$D_{50} \text{ of composite particles} < D_{50} \text{ of negative electrode active material particles} \times 2 \quad \text{[Formula A1]}$$

$$D_{10} \text{ of composite particles} < D_{10} \text{ of negative electrode active material particles} \times 2 \quad \text{[Formula A2]}$$

$$D_{90} \text{ of composite particles} < D_{90} \text{ of negative electrode active material particles} \times 2 \quad \text{[Formula A3]}$$

(3) Determination of Change in Viscosity with Lapse of Time

TABLE 2

|  | Ex. 1 | Ex. 2 | Comp. Ex. 1 |
| --- | --- | --- | --- |
| Negative electrode active material | Artificial graphite 48.5 (wt %) | Artificial graphite 48.5 (wt %) | Artificial graphite 48.5 (wt %) |
| Conductive material | Carbon black (0.5 wt %) | Carbon black (0.5 wt %) | Carbon black (0.5 wt %) |
| Thickener | CMC(carboxymethyl cellulose) (0.5 wt %) | CMC(carboxymethyl cellulose) (0.5 wt %) | CMC(carboxymethyl cellulose) (0.5 wt %) |
| Binder | Styrene Butadiene Rubber(A) (0.5 wt %) | Styrene Butadiene Rubber(B) (0.5 wt %) | Styrene Butadiene Rubber(C) (0.5 wt %) |
| Solvent | D.I water (50 wt %) | D.I water (50 wt %) | D.I. water (50 wt %) |

Figure 3:
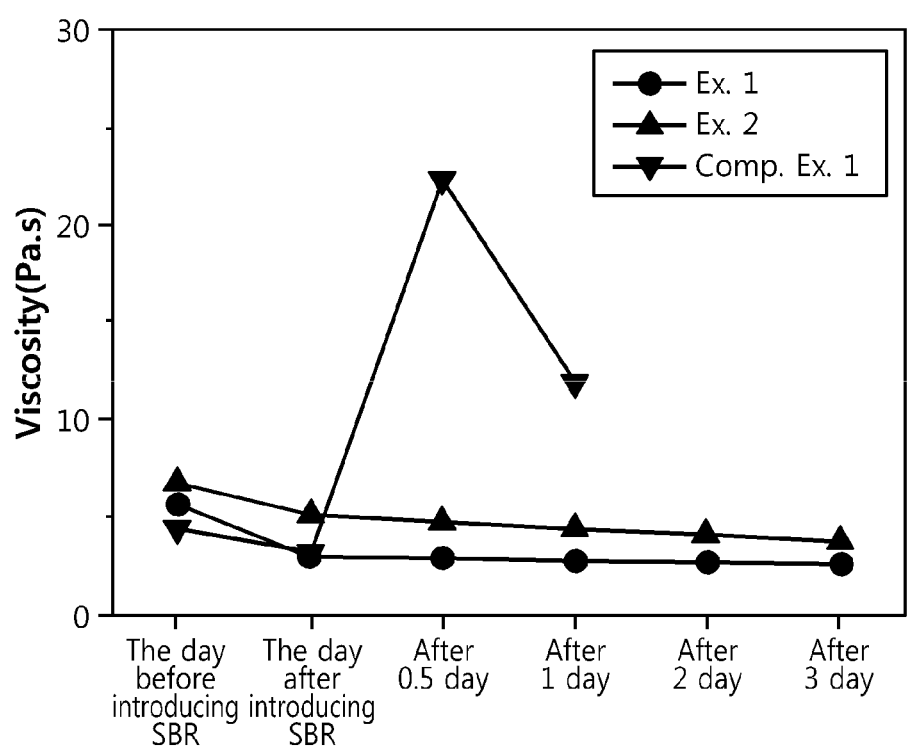
FIG. 3 illustrates a change in viscosity of the slurry according to each of Example and Comparative Example with the lapse of time.

Electrode slurry was prepared according to the compositions as shown in Table 2. The active material ingredient and binder ingredient used for the electrode slurry according to each of Examples and Comparative Example were the same as used for each mixed sample. First, the active material, conductive material and the thickener were introduced to a small amount of solvent and mixed to obtain high-viscosity slurry. Herein, the thickener is not introduced at once but only a portion of the thickener is introduced. Then, the remaining thickener and solvent were introduced. After that, the binder was introduced and mixed. Each slurry was introduced to a mixer and agitated under 25 rpm. In addition, the slurry was sampled with the lapse of agitation time and the viscosity was measured by using a rheometer (T.A. Instrument) depending on shear rate. The results are shown in FIG. 3. The viscosity value in FIG. 3 is based on a shear rate of 1.0 (l/s). It can be seen from FIG. 3 that the mixed samples according to Examples 1 and 2 show little change in viscosity with time, but the mixed sample according to Comparative Example 1 shows an increase in viscosity of about 4 times of the initial viscosity after 0.5 days (12 hours).

What is claimed is:

1. A method for selecting an electrode slurry, comprising:
preparing a test sample comprising a plurality of electrode active material particles selected from a group consisting of natural graphite, artificial graphite, expanded graphite, carbon fibers, non-graphitizable carbon, carbon black, carbon nanotubes, fullerene and activated carbon, a polymer resin for a binder and a solvent,
wherein composite particles are formed by aggregation of the electrode active material particles and the polymer resin for the binder;
determining a particle size distribution of the composite particles present in the test sample; and
comparing the particle size distribution of the composite particles with a particle size distribution of the electrode active material particles,
wherein the particle size distribution of the composite particles and the particle size distribution of the electrode active material particles are at least one of $D_{50}$, $D_{10}$, or $D_{90}$; and
selecting the polymer resin for the binder for preparing a final electrode slurry from the polymer resin for the binder introduced to the test sample when the condition of Formula 1 is satisfied:

$D_{50}$ of composite particles<$D_{50}$ of negative electrode active material particles×$A$, [Formula 1]

wherein A is 0.001-10.0.

2. The method for selecting the electrode slurry according to claim 1, wherein the electrode active material particles comprise a carbonaceous material and the solvent is water.

3. The method for selecting the electrode slurry according to claim 1, wherein the polymer resin for the binder is present in an amount of 0.05-0.3 parts by weight based on 1 part by weight of the electrode active material particles and the solvent is present in an amount of 8-15 parts by weight based on 1 part by weight of the electrode active material particles.

4. The method for selecting the electrode slurry according to claim 1, wherein the polymer resin for the binder is a particle-shaped polymer.

5. The method for selecting the electrode slurry according to claim 1, which further comprises comparing $D_{10}$ and/or $D_{90}$ of the composite particles in the test sample with $D_{10}$ and/or $D_{90}$ of negative electrode active material particles.

6. The method for selecting the electrode slurry according to claim 1, wherein the polymer resin for the binder introduced to the test sample is selected as the polymer resin for the binder for preparing the final electrode slurry, when the condition of Formula 2 and/or the condition of Formula 3 is satisfied in addition to the condition of Formula 1:

$D_{10}$ of composite particles<$D_{10}$ of negative electrode active material particles×$A$, [Formula 2]

$D_{90}$ of composite particles<$D_{90}$ of negative electrode active material particles×$A$, [Formula 3]

wherein in Formula 2 and Formula 3, each A independently represents 0.001-10.0.

7. The method for selecting the electrode slurry according to claim 6, wherein A ranges from 0.001-10.0 in Formula 1 to Formula 3, and A is determined considering at least one selected from the group consisting of introduced materials, slurry concentration, processing time, transport distance of slurry, temperature of slurry, temperature condition of slurry storage place, humidity condition of slurry storage place and slurry storage time.

8. The method for selecting the electrode slurry according to claim 1, wherein the polymer resin for the binder introduced to the test sample is selected as the polymer resin for the binder for preparing the final electrode slurry, when the condition of Formula 2 and the condition of Formula 3 are satisfied in addition to the condition of Formula 1:

$D_{10}$ of composite particles<$D_{10}$ of negative electrode active material particles×$A$, [Formula 2]

$D_{90}$ of composite particles<$D_{90}$ of negative electrode active material particles×$A$, [Formula 3]

wherein in Formula 2 and Formula 3, each A independently represents 1-3.

* * * * *